United States Patent

Watanabe et al.

[11] Patent Number: 5,195,694
[45] Date of Patent: Mar. 23, 1993

[54] PRELOADER

[75] Inventors: Yasutaka Watanabe; Shigeru Kotama; Fuminori Teraoka, all of Aichi, Japan

[73] Assignee: Kabushiki Kaisha Tokai-Rika-Denki Seisakusho, Aichi, Japan

[21] Appl. No.: 796,822

[22] Filed: Nov. 25, 1991

[30] Foreign Application Priority Data

Nov. 30, 1990 [JP] Japan .................... 2-130470[U]

[51] Int. Cl.⁵ ............................................. B60R 22/40
[52] U.S. Cl. .................................. 242/107.2; 242/107; 280/806
[58] Field of Search ..................... 242/107, 107.2; 280/806, 807, 808

[56] References Cited

U.S. PATENT DOCUMENTS

| | | | |
|---|---|---|---|
| 4,235,419 | 11/1980 | Schuck | 242/107.2 X |
| 4,451,062 | 5/1984 | Zin | 242/107.2 X |
| 4,618,108 | 10/1986 | Buterop et al. | 242/107 |
| 4,840,325 | 6/1989 | Higuchi et al. | 242/107.2 |
| 5,004,178 | 4/1991 | Kobayashi et al. | 242/107.2 X |
| 5,076,610 | 12/1991 | Struck | 280/807 X |
| 5,118,135 | 6/1992 | Yano | 242/107 X |
| 5,127,598 | 7/1992 | Fujimura | 242/107.2 |
| 5,127,671 | 7/1992 | Yano et al. | 280/806 |

Primary Examiner—Daniel P. Stodola
Assistant Examiner—John P. Darling
Attorney, Agent, or Firm—Sixbey, Friedman, Leedom & Ferguson

[57] ABSTRACT

A preloader adapted to forcibly pull a webbing in a taking-up direction when the vehicle suddenly decelerates, so as to allow the webbing to be applied closely around an occupant. A clamp member for clamping the webbing is provided to prevent a subsequent tight winding of the webbing. The clamp member is constantly urged in a webbing-clamping direction by an urging member, and is normally held in a position spaced apart from the webbing against an urging force of the urging member. As the holding is canceled after the forcible taking up of the webbing, the clamp member is capable of clamping the webbing.

24 Claims, 6 Drawing Sheets

PRELOADER

BACKGROUND OF THE INVENTION

1. Field of the Invention

The present invention relates to a preloader for use in a webbing retractor, and adapted to allow a webbing to be applied to a vehicle occupant with appropriate tightness when a vehicle suddenly decelerates.

2. Description of the Related Art

A seat belt apparatus is adapted to restrain a vehicle occupant with appropriate tightness by means of a webbing when a vehicle suddenly decelerates. If there is a large clearance between the webbing and the occupant, however, the seat belt apparatus cannot display a restraining performance sufficiently. For this reason, preloaders for allowing the webbing to be applied closely around the occupant by forcibly pulling the webbing in the direction of retraction when the vehicle suddenly decelerates, as well as webbing retractors equipped with the preloader, have been proposed.

The preloader of this type is provided with a clutch mechanism, comprised of a rotating drum, which corresponds to a takeup shaft. As a result, in a normal state of the vehicle, the preloader allows the webbing to be retracted and paid out freely without hampering the rotation of the takeup shaft. When the vehicle suddenly decelerates, however, the preloader suddenly causes the takeup shaft to rotate in a taking-up direction so as to retract the webbing immediately.

With the webbing retractor provided with such a conventional preloader, although when the vehicle suddenly decelerates, the preloader is actuated and forcibly pulls the webbing in the taking-up direction so as to apply the webbing closely around the occupant, there has been a drawback in that if a large webbing-drawing-out force acts after the webbing has been temporarily taken up (after the actuation of the preloader), the webbing is drawn out due to the so-called tight winding of the webbing in the same way as a conventional webbing retractor.

SUMMARY OF THE INVENTION

Accordingly, it is a primary object of the present invention to provide a preloader capable of reliably restraining a vehicle occupant not only by forcibly pulling a webbing in a taking-up direction at the time of a sudden deceleration of the vehicle to allow the webbing to be closely applied to the occupant, but also by preventing the subsequent tight winding of the webbing, thereby overcoming the above-described drawback of the conventional art.

To this end, in accordance with the present invention, there is provided a preloader for use in a webbing retractor and adapted to forcibly take up an occupant-restraining webbing onto a takeup shaft, comprising: a rotating drum disposed in such a manner as to be capable of engaging the takeup shaft and adapted to impart a torque integrally with the takeup shaft at the time of engagement between the rotating drum and the takeup shaft; a clamp member disposed in correspondence with the webbing being drawn out of the takeup shaft, the clamp member being movable in a direction in which the clamp member engages the webbing and in a direction in which the clamp member moves away from the webbing, and the clamp member being adapted to clamp the webbing being drawn out of the takeup shaft in a state of engagement so as to prevent the webbing from being drawn out; urging means for constantly urging the clamp member in a webbing-clamping direction; holding means for normally holding the clamp member in spaced-apart relationship with the webbing against an urging force of the urging means; an elongated member wound around the rotating drum and arranged such that the elongated member, when tightly drawn, forcibly causes the rotating drum to engage the takeup shaft and to be rendered integral with the takeup shaft so as to rotate the rotating drum in a webbing-taking-up direction, and cancels a holding state of the holding means so as to permit the movement of the clamp member in the webbing-clamping direction; and an actuating source connected to one end of the elongated member and adapted to forcibly pull the elongated member in the webbing-taking-up direction and render the elongated member taut when the vehicle suddenly decelerates.

With the above-described preloader, in a normal state of the vehicle, the rotating drum is separated from the takeup shaft, so that the takeup shaft is rotatable. For this reason, the occupant-restraining webbing can be freely taken up and withdrawn.

When the vehicle reaches the state of a sudden deceleration of the vehicle, the wire is pulled and made taut by the driving force of the actuating source. As a result, the rotating drum is forcibly engaged with the takeup shaft and made integral therewith, so that the takeup shaft is rotated in the webbing-taking-up direction integrally with the rotating drum. Hence, the webbing is forcibly pulled in the taking-up direction and is applied closely around the occupant.

At the same time, as the wire is drawn tightly, the holding of the clamp member by the holding means is canceled. For this reason, the clamp member is moved in the webbing-clamping direction by the urging force of the urging means, thereby clamping the webbing. Consequently, the drawing out of the webbing from the takeup shaft is prevented. Accordingly, the subsequent tight winding of the webbing is prevented, and the occupant can be restrained reliably.

The above and other objects, features and advantages of the present invention will become more apparent from the following description of the invention when read in conjunction with the accompanying drawings.

DESCRIPTION OF THE PREFERRED EMBODIMENTS

Figure 1:
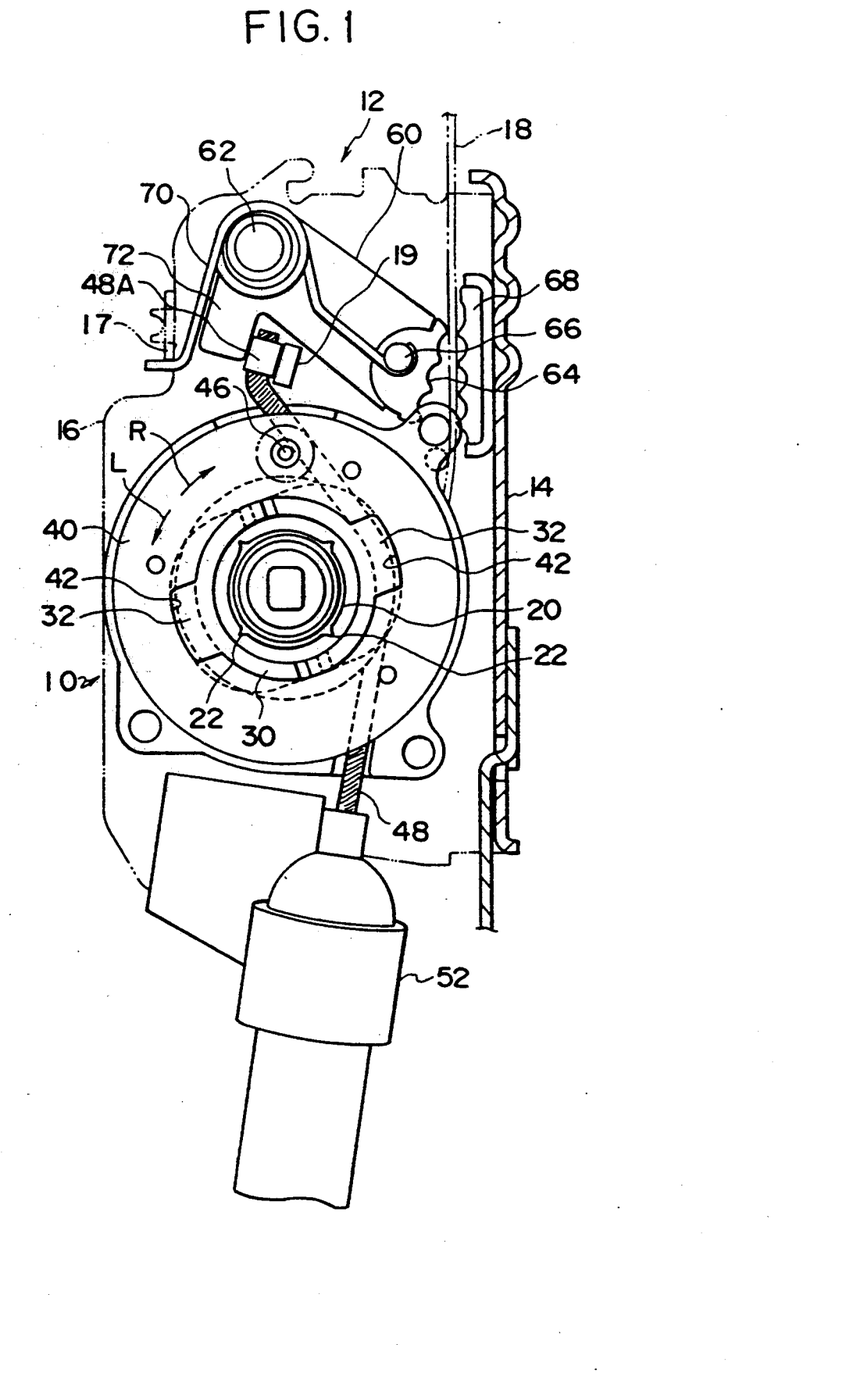
FIGS. 1 and 2 are cross-sectional views of a preloader in accordance with a first embodiment of the present invention and a webbing retractor to which the preloader is applied.
Figure 2:
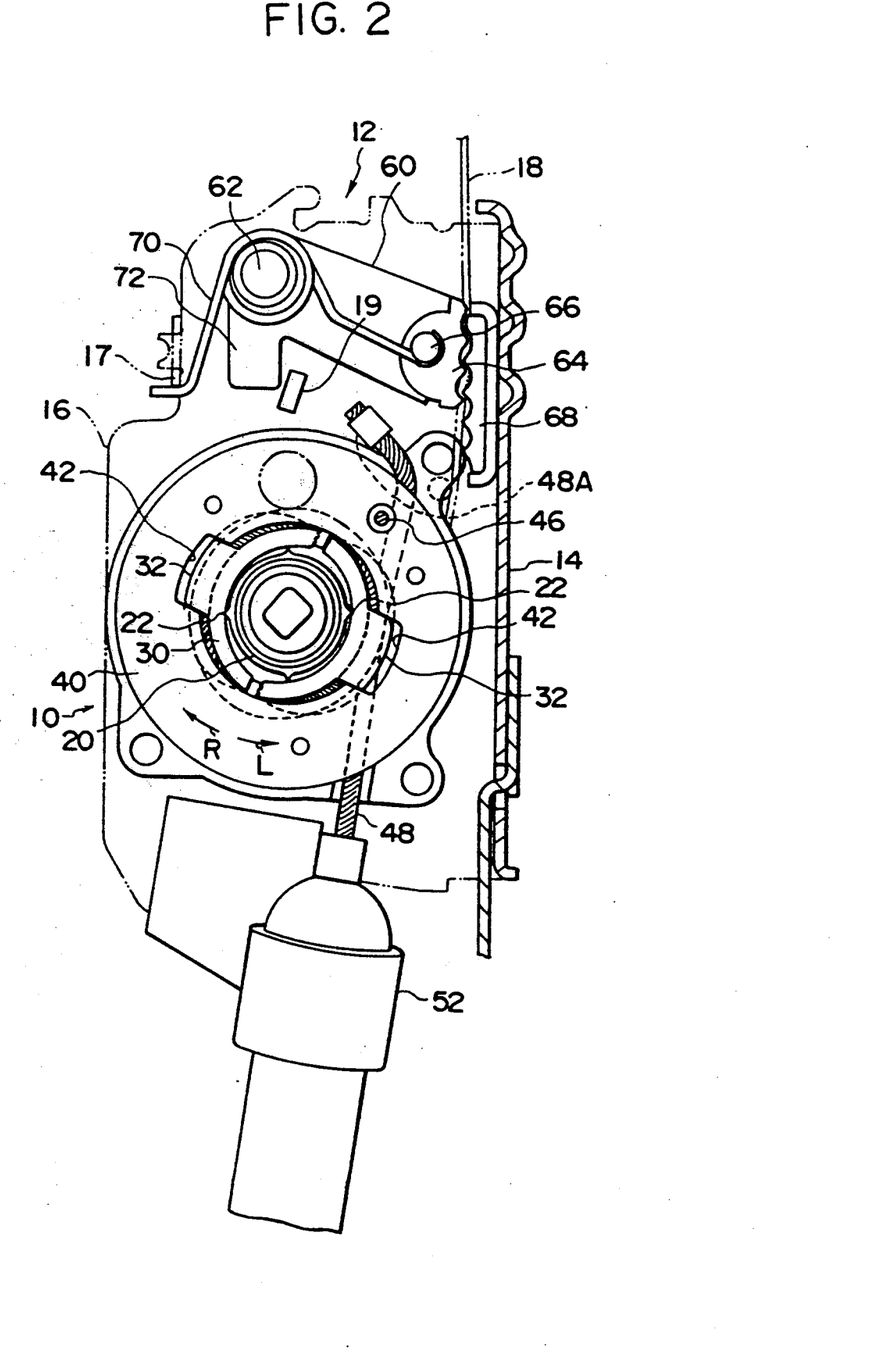

FIGS. 1 and 2 show cross-sectional views of a preloader 10 in accordance with a first embodiment of the present invention and a webbing retractor 12 to which the preloader 10 is applied.

In the webbing retractor 12, an unillustrated takeup shaft is rotatably supported between a pair of opposing side plates 16 of a frame 14, and one end of a webbing 18 for restraining an occupant is taken up onto the takeup shaft in the form of a roll.

One end portion of the takeup shaft projects outwardly of the side plate 16 by a predetermined length, and an engaging shaft 20 is integrally coupled therewith. As a result, the engaging shaft 20 always rotates integrally with the takeup shaft. Pawls 22 are projectingly formed around an outer periphery of the engaging shaft 20 along an axis thereof. An unillustrated spiral spring is connected to the engaging shaft 20, with the result that the engaging shaft 20, i.e., the takeup shaft, is constantly urged in a webbing-taking-up direction (in the direction of arrow R in FIG. 1). Accordingly, the webbing 18 can be drawn out as the takeup shaft (engaging shaft 20) is rotated in a drawing-out direction (in the direction of arrow L in FIG. 1) against an urging force of the spiral spring.

A rotating drum 30 is disposed radially outwardly of the engaging shaft 20. The rotating drum 30 is formed in a substantially cylindrical configuration whose inside diameter is slightly larger than the outside diameter of the engaging shaft 20, and the engaging shaft 20 is freely rotatable in a state in which the inner peripheral surface of the rotating drum 30 does not abut against the pawls 22 of the engaging shaft 20. This rotating drum 30 is formed of a flexible member, and a portion of the outer periphery thereof is notched in an axial direction so as to facilitate the deformation of the rotating drum 30. In addition, a pair of arms 32 are formed at an axial end of the rotating drum 30 in such a manner as to extend radially outwardly therefrom and are fitted in fitting holes 42 formed in a plate 40, respectively. Consequently, the rotating drum 30 is capable of rotating the plate 40 integrally therewith.

The plate 40 is held by the side plate 16 by means of a shear pin 46, with the result that the rotating drum 30 is also held in position. The shear pin 46 is adapted to be sheared when a predetermined shearing force is applied thereto.

In addition, an intermediate portion of a wire 48 is wound around the rotating drum 30. One end of the wire 48 is connected to a piston of a cylinder 52 serving as an actuating source. The cylinder 52 is provided with a gas generator for producing a large amount of gas and injecting it into the cylinder 52 when an unillustrated acceleration sensor has detected the state of a sudden deceleration of the vehicle. Accordingly, in that case, the wire 48 is pulled under the pressure of the injected gas, the intermediate portion of the wire 48 wound around the rotating drum 30 is tightly wound, and a torque acting in the webbing-taking-up direction occurs in the rotating drum 30 and the plate 40.

Since a deforming force of the rotating drum 30 is set to be smaller than a shearing force of the shear pin 46, the rotating drum 30 is first collapsed by the tightly winding force of the wire 48 and is thereby deformed toward the axis when the intermediate portion of the wire 48 is tightly wound around the rotating drum 30.

The other end of the wire 48 is engaged with a lock lever 60 serving as a clamp member disposed immediately above the rotating drum 30. In addition, a portion of the wire 48 in the vicinity of the other end thereof is secured to the plate 40 in proximity to the shear pin 46 by caulking.

A support pin 62 projects from one end of the lock lever 60 and is swingably supported on the side plate 16. In addition, a clamp block 64 whose cross-section is substantially semicircular is attached to the other end of the lock lever 60 by means of a support pin 66.

The clamp block 64 opposes a longitudinally intermediate portion of the webbing 18 which is drawn out from the takeup shaft, and the surface of the clamp block 64 opposing the webbing 18 is formed in a corrugated manner. In addition, a lock base 68 is secured to the frame 14 opposing the clamp block 64. The surface of the lock base 68 opposing the webbing 18 (clamp block 64) is also formed in a corrugated manner in correspondence with the clamp block 64. Consequently, as the lock lever 60 swings about the support pin 62, the webbing 18 can be clamped by the clamp block 64 and the lock base 68.

A torsion coil spring 70 serving as an urging member is fitted over the support pin 62 of the lock lever 60, and one end of this torsion coil spring 70 is retained by a reinforcing member 17 of the side plate 16, while the other end thereof is retained by the support pin 66. For this reason, the lock lever 60 is constantly urged in a direction in which the clamp block 64 approaches the lock base 68, i.e., in the direction in which the clamp block 64 clamps the webbing 18.

An arm 72 constituting a part of a holding means extends from a portion of the lock lever 60 in the vicinity of the support pin 62 toward the rotating drum 30. A distal end portion 48A of the wire 48 is clamped and held by the arm 72 and a holding portion 19 projecting from the side plate 16 and constituting another part of the holding means. In other words, as the distal end portion 48A of the wire 48 is interposed between the arm 72 and the holding portion 19, the clamp block 64 of the lock lever 60 is held in spaced apart relationship with the lock base 68 against the urging force of the torsion coil spring 70. When the holding of the wire 48 (distal end portion 48A) by the arm 72 is canceled (i.e., when the distal end portion 48A of the wire 48 ceases to be present between the arm 72 and the holding portion 19), the clamp block 64 is moved in the webbing-clamping direction by the urging force of the torsion coil spring 70.

The webbing retractor 12 having the above-described arrangement is also provided with an unillustrated lock mechanism for instantaneously preventing the rotation of the takeup shaft in the webbing-drawing-out direction upon being actuated by the acceleration sensor.

The operation of this embodiment will be described hereinafter.

In the normal state of the vehicle, since the inner peripheral surface of the rotating drum 30 is spaced apart from the pawls 22 of the engaging shaft 20, the engaging shaft 20, i.e., the takeup shaft, is capable of rotating either in the direction in which the webbing 18 is taken up or in the direction in which it is drawn out. Accordingly, since the webbing 18 is freely taken up or drawn out with respect to the takeup shaft by following changes in the occupant's posture, the occupant is not restrained.

However, when the vehicle reaches the state of a sudden deceleration (a state in which a large acceleration of, for instance, 10G or thereabouts has acted), the acceleration sensor detects the same, and the gas generator of the cylinder 52 is actuated. As a result, the wire 48 is pulled, and the intermediate portion of the wire 48 is tightly wound around the rotating drum 30. Here, since the deforming force of the rotating drum 30 is set to be smaller than the shearing force of the shear pin 46, the rotating drum 30 is first collapsed by the tightly winding force of the wire 48 and is thereby deformed toward the axis. Hence, the pawls 22 of the engaging shaft 20 bite into the inner peripheral surface of the rotating drum 30, and the rotating drum 30 and the engaging shaft 20 are made integral (in the state illustrated in FIG. 2). Furthermore, a torque acts on the plate 40 through the rotation of the rotating drum 30, causing the shear pin 46 to be sheared and canceling the holding. As a result, the rotating drum 30 and the engaging shaft 20 rotate integrally in the webbing-taking-up direction (in the direction of arrow R in FIG. 2) together with the plate 40. Hence, the takeup shaft is suddenly rotated in the taking-up direction so as to forcibly take up the webbing 18, thereby allowing the webbing 18 to be applied closely around the occupant.

At approximately the same time, the webbing 18 tends to be pulled out of the webbing retractor 12 by the inertial movement of the occupant, but the unillustrated lock mechanism for instantaneously preventing the rotation of the takeup shaft in the webbing-drawing-out direction is actuated, so that the takeup shaft is prevented from rotating in the webbing-drawing out direction. As a result, the occupant is restrained reliably with the webbing 18 applied closely around him or her.

Furthermore, at approximately the same time, as the wire 48 is pulled and the rotating drum 30 is rotated, the distal end portion 48A of the wire 48 interposed between the arm 72 and the holding portion 19 slips out (the distal end portion 48A of the wire 48 ceases to be present between the arm 72 and the holding portion 19). As a result, the engagement between the wire 48 and the arm 72 of the lock lever 60 (the holding of the lock lever 60 by the wire 48) is canceled. Hence, the lock lever 60 is moved in the webbing-clamping direction by the urging force of the torsion coil spring 70 and clamps the webbing 18 (in the state shown in FIG. 2). Consequently, the drawing out of the webbing 18 is prevented. Accordingly, the subsequent tight winding of the webbing 18 is prevented, and the occupant can be restrained reliably.

Thus, as the webbing 18 is forcibly pulled in the taking-up direction when the vehicle suddenly decelerates, the webbing 18 can be applied closely around the occupant, and the subsequent tight winding of the webbing 18 can be prevented, thereby reliably restraining the occupant.

A description will now be given of other embodiments of the present invention. It should be noted that basically the same component parts as those of the first embodiment are denoted by the same reference numerals, and a description thereof will be omitted.

Figure 3:
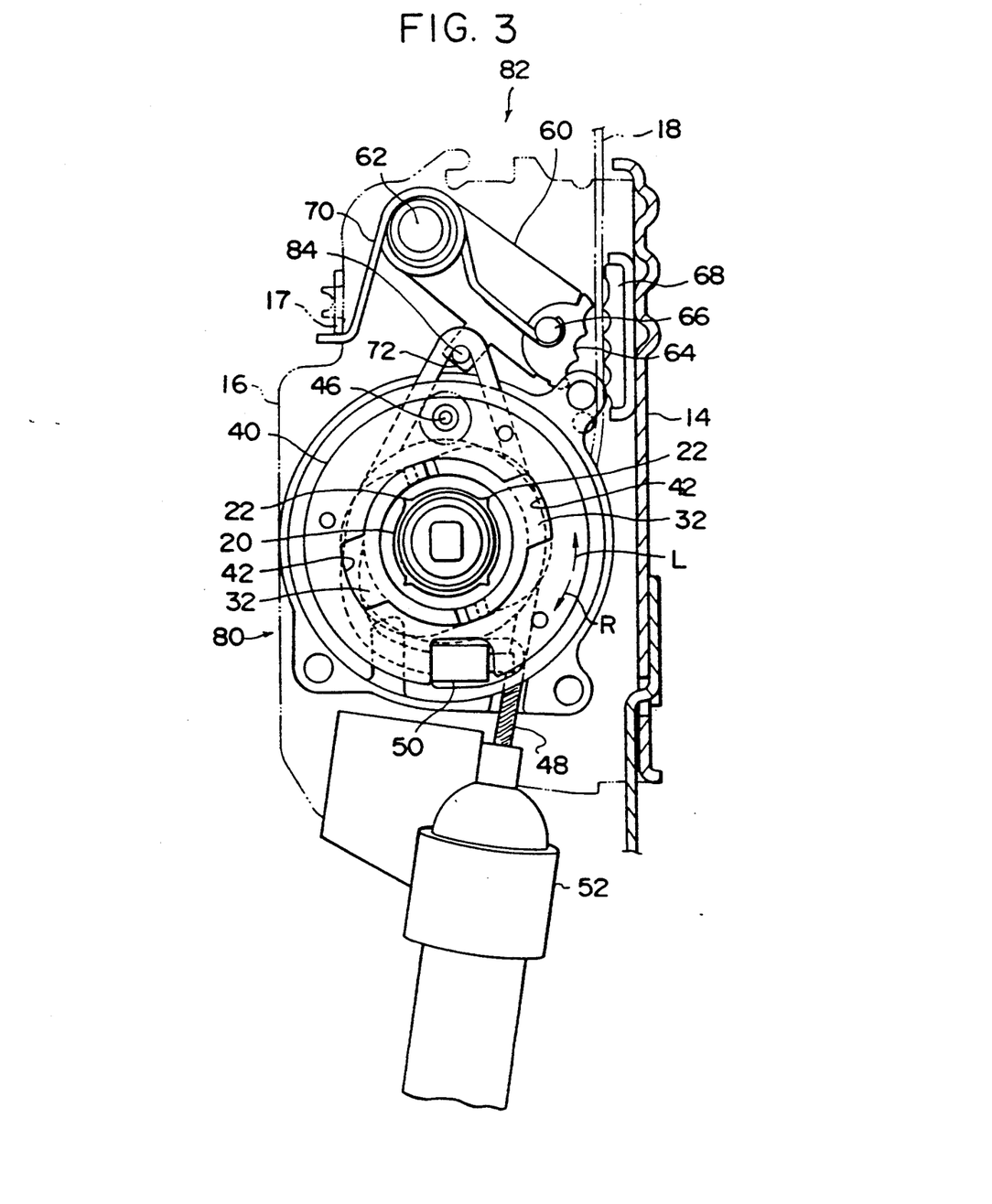
FIGS. 3 and 4 are cross-sectional views of a preloader in accordance with a second embodiment of the present invention and a webbing retractor to which the preloader is applied.
Figure 4:
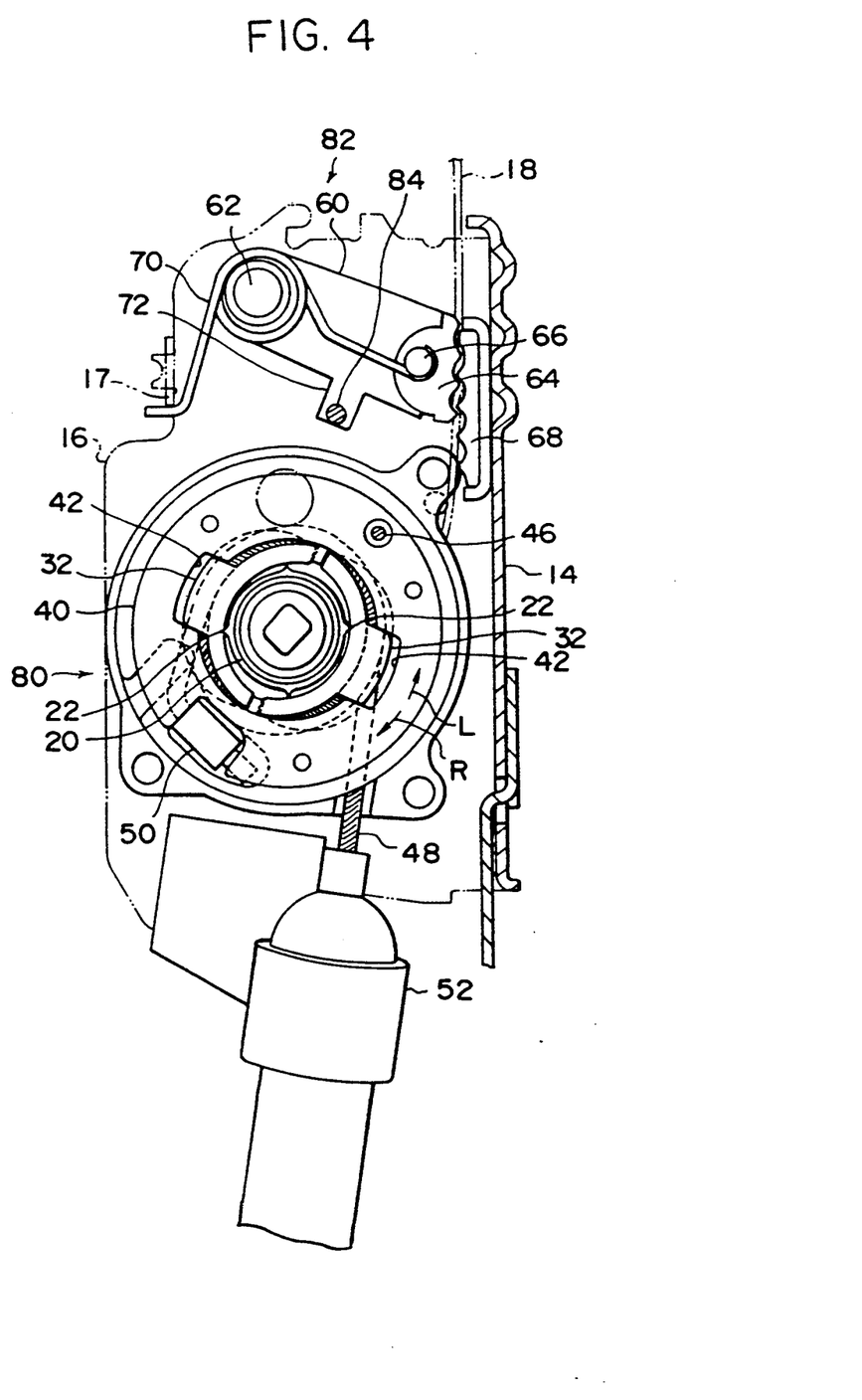

FIGS. 3 and 4 show cross-sectional views of a preloader 80 in accordance with a second embodiment of the present invention and a webbing retractor 82 to which the preloader is applied.

In the webbing retractor 82, the distal end of the wire 48 is secured to the plate 40 by means of a piece 50. In addition, the arm 72 extends toward the rotating drum 30 from a portion of the lock lever 60 between the clamp block 64 and a longitudinally central portion of the lock lever 60. A shear pin 84 constituting the holding means is secured to the arm 72, and an intermediate portion of the wire 48 wound around the rotating drum 30 is wound around the shear pin 84.

The lock lever 60 is normally held by the wire 48 wound around the shear pin 84 against the urging force of the torsion coil spring 70, and the clamp block 64 is maintained in a state in which it is spaced apart from the lock base 68. Meanwhile, when the shear pin 84 is sheared, the holding of the lock lever 60 is canceled, and the clamp block 64 is moved in the direction in which it clamps the webbing 18, by the urging force of the torsion coil spring 70.

With this webbing retractor 82 as well, when the vehicle reaches the state of a sudden deceleration, the rotating drum 30 is rotated in the webbing-taking-up direction integrally with the engaging shaft 20. As a result, the webbing 18 is forcibly taken up, thereby allowing the webbing 18 to be applied closely around the occupant.

At approximately the same time, when the wire 48 is pulled and becomes taut, the shear pin 84 of the arm 72 is sheared. As a result, the holding of the lock lever 60 is canceled, and the lock lever 60 is moved in the webbing-clamping direction by the urging force of the torsion coil spring 70, thereby clamping the webbing 18 (in the state shown in FIG. 4). Accordingly, the drawing out of the webbing 18 is prevented, and the subsequent tight winding of the webbing 18 is prevented, so that the occupant can be restrained reliably.

Thus, with the webbing retractor 82 as well, as the webbing 18 is forcibly pulled in the taking-up direction when the vehicle suddenly decelerates, the webbing 18 is applied closely around the occupant, and the subsequent tight winding of the webbing 18 is prevented, so that the occupant is restrained reliably.

Figure 5:
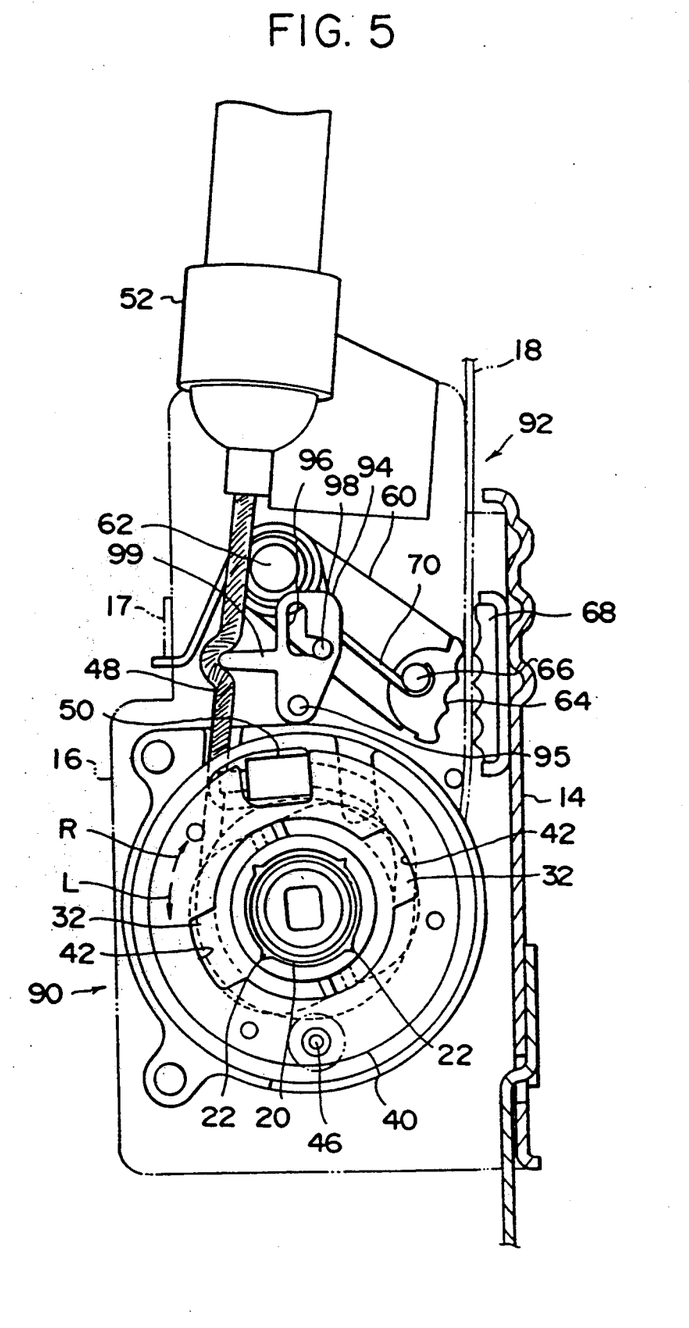
FIGS. 5 and 6 are cross-sectional views of a preloader in accordance with a third embodiment of the present invention and a webbing retractor to which the preloader is applied.
Figure 6:
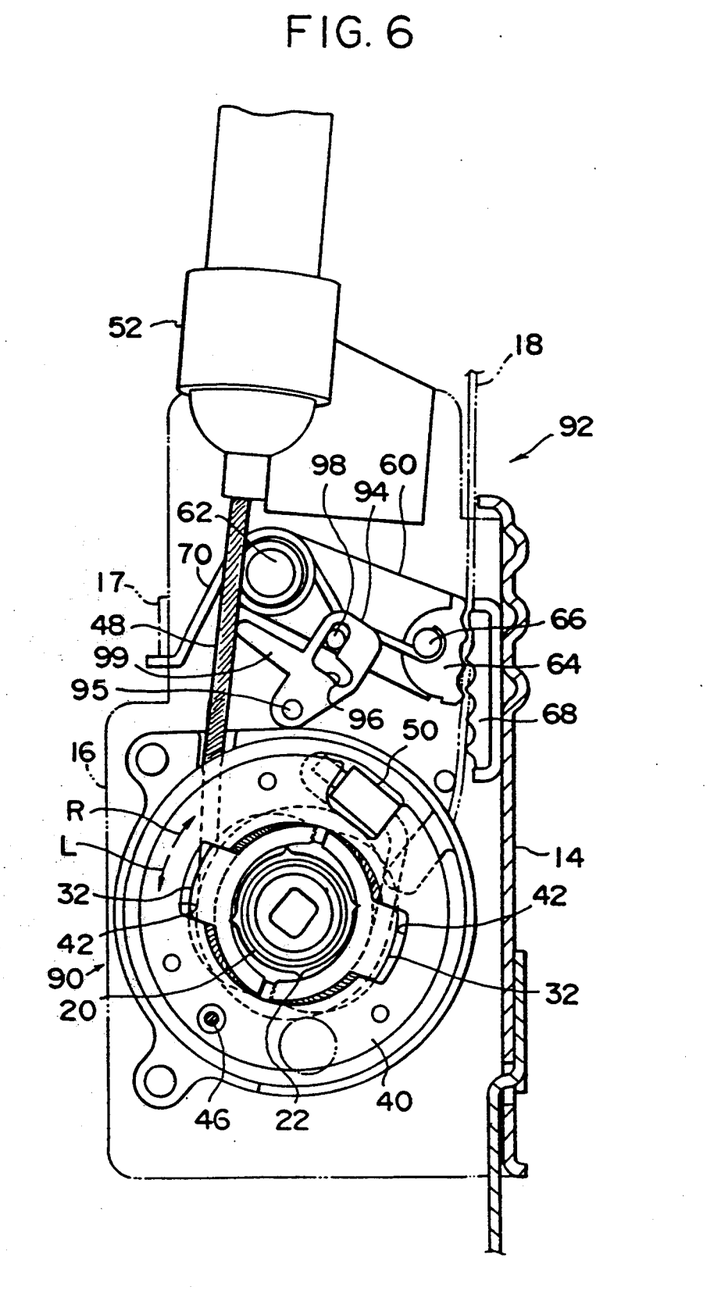

FIGS. 5 and 6 show cross-sectional views of a preloader 90 in accordance with a third embodiment of the present invention and a webbing retractor 92 to which the preloader is applied.

In the webbing retractor 92, a cam 94 serving as the holding means is disposed between the lock lever 60 and the rotating drum 30. The cam 94 has one end rotatably supported by the side plate 16 via a support shaft 95. In addition, a substantially L-shaped holding hole 96 is formed in a portion of the cam 94 in the vicinity of the other end portion of the cam 94, and a pin 98 secured to the lock lever 60 is movably fitted in the holding hole 96.

An arm 99 is projectingly formed on an intermediate portion of the cam 94. An intermediate portion of the wire 48 (between the rotating drum 30 and the cylinder 52) after the wire is wound around the rotating drum 30 abuts against the arm 99 in a slack state.

The pin 98 normally is located at one end of the holding hole 96, with the result that the cam 94 holds the lock lever 60 against the urging force of the torsion coil spring 70 such that the clamp block 64 is spaced apart from the lock base 68. Meanwhile, when the wire 48 becomes taut, the arm 99 is pressed by the wire 48, so that the cam 94 rotates about the support shaft 95. This causes the pin 98 to move to the other end of the holding hole 96. Consequently, the holding of the lock lever 60 by the cam 94 is canceled, thereby allowing the clamp block 64 to be moved in the webbing-clamping direction by the urging force of the torsion coil spring 70.

With this webbing retractor 92 as well, when the vehicle reaches the state of a sudden deceleration, the rotating drum 30 is made integral with the engaging shaft 20 and is rotated in the webbing-taking-up direction. As a result, the webbing 18 is forcibly taken up, thereby allowing the webbing 18 to be applied closely around the occupant.

At approximately the same time, when the wire 48 is pulled and becomes taut, the arm 99 is pressed by the wire 48, which causes the cam 94 to rotate, so that the pin 98 moves to the other end of the holding hole 96. Hence, the holding of the lock lever 60 by the cam 94 is canceled, and the lock lever 60 is moved in the webbing-clamping direction by the urging force of the torsion coil spring 70, so as to clamp the webbing 18 (in the state shown in FIG. 6). Accordingly, the drawing out of the webbing 18 is prevented, and the subsequent tight winding of the webbing 18 is prevented, thereby allowing the occupant to be restrained reliably.

Thus, with the webbing retractor 92 as well, as the webbing 18 is forcibly pulled in the taking-up direction when the vehicle suddenly decelerates, the webbing 18 can be applied closely around the occupant, and the subsequent tight winding of the webbing 18 can be prevented, thereby reliably restraining the occupant.

What is claimed is:

1. A preloader for use in a webbing retractor and adapted to forcibly take up an occupant-restraining webbing onto a takeup shaft when a vehicle suddenly decelerates, comprising:
    a rotating drum disposed in such a manner as to be capable of engaging said takeup shaft and adapted to impart a torque integrally with said takeup shaft at the time of engagement between said rotating drum and said takeup shaft;
    a clamp member disposed in correspondence with the webbing being drawn out of said takeup shaft, said clamp member being movable in a direction in which said clamp member engages the webbing and in a direction in which said clamp member moves away from the webbing, and said clamp member being adapted to clamp the webbing being drawn out of said takeup shaft in a state of engagement so as to prevent the webbing from being drawn out;
    urging means for constantly urging said clamp member in a webbing-clamping direction;
    holding means for normally holding said clamp member in spaced-apart relationship with the webbing against an urging force of said urging means;
    an elongated member wound around said rotating drum and arranged such that said elongated member, when tightly drawn, forcibly causes said rotating drum to engage said takeup shaft and to be rendered integral with said takeup shaft so as to rotate said rotating drum in a webbing taking-up direction, and cancels a holding state of said holding means so as to permit the movement of said clamp member in the webbing-clamping direction; and
    an actuating source connected to one end of said elongated member and adapted to forcibly pull said elongated member in the webbing-taking-up direction and render the elongated member taut when the vehicle suddenly decelerates.

2. A preloader according to claim 1, wherein the tension of said elongated member necessary for causing said rotating drum to engage said takeup shaft is set to be smaller than the tension of said elongated member necessary for canceling the holding state of said holding means.

3. A preloader according to claim 2, wherein said elongated member cancels the holding state of said holding means as said elongated member is drawn out of said holding means.

4. A preloader according to claim 2, wherein an intermediate portion of said elongated member is bent by being wound around said holding means, and the holding state of said holding means is canceled as the bent portion of said elongated member is stretched by the tension of said elongated member.

5. A preloader according to claim 1, wherein said holding means holds said clamp member in spaced-apart relationship with the webbing in a state in which said holding means abuts against said elongated member.

6. A preloader according to claim 1, wherein said holding means holds said clamp member in spaced-apart relationship with the webbing by means of a shear pin.

7. A preloader according to claim 1, wherein said holding means has a holding member secured to said webbing retractor, and holds said clamp member in spaced-apart relationship with the webbing as another end of said elongated member is disposed between said holding member and an arm extending from said clamp member, and wherein as said elongated member is rendered taut by said actuating source when the vehicle suddenly decelerates, said another end of said elongated member is disengaged from between said holding member and said arm, thereby allowing said clamp member to move in the webbing-clamping direction.

8. A preloader according to claim 1, wherein said holding means has a holding member secured to an arm extending from said clamp member, and said clamp member is held in spaced-apart relationship with the webbing as an intermediate portion of said elongated member is wound around said holding member, and wherein as said elongated member is rendered taut by said actuating source when the vehicle suddenly decelerates, said intermediate portion of said elongated member is disengaged from said holding member, thereby allowing said clamp member to move in the webbing-clamping direction.

9. A preloader according to claim 8, wherein the movement of said clamp member in the webbing-clamping direction is attained as said holding member is sheared.

10. A preloader according to claim 1, wherein said holding means includes cam means supported rotatably by said webbing retractor.

11. A preloader according to claim 10, wherein as the rotation of said cam means is prevented by said elongated member, said clamp member is held in spaced-apart relationship with the webbing.

12. A preloader according to claim 11, wherein said cam means has a substantially L-shaped guide slot, and a projection provided on said clamp member is guided by said guide slot as said cam means rotates, thereby moving said clamp member in the webbing-clamping direction.

13. A preloader for use in a webbing retractor and adapted to forcibly take up an occupant-restraining webbing onto a takeup shaft when a vehicle suddenly decelerates, comprising:
    a rotating drum capable of engaging said takeup shaft as said rotating drum is deformed, said rotating drum being adapted to impart a torque integrally with said takeup shaft at the time of engagement between said rotating drum and said takeup shaft;
    a retaining member for retaining said rotating drum onto said webbing retractor, a deforming force of said retaining member being greater than a deforming force of said rotating drum;
a clamp member disposed in correspondence with the webbing being drawn out of said takeup shaft, said clamp member being rotatable between a first position in which said clamp member is spaced apart from the webbing and a second position in which said clamp member engages the webbing, and said clamp member, when located in said second position, being adapted to clamp the webbing being drawn out of said takeup shaft so as to prevent the webbing from being drawn out;
a resilient member for constantly urging said clamp member in a direction from said first position toward said second position;
holding means including a holding member disposed between said rotating drum and said clamp member, said holding means being adapted to normally hold said clamp member in said first position against an urging force of said resilient member;
a wire wound around said rotating drum and adapted to normally hold said clamp member in said first position in cooperation with said holding member, said wire being arranged such that said wire, when tightly drawn, deforms said rotating drum and forcibly causes said rotating drum to engage said takeup shaft and to be rendered integral with said takeup shaft, subsequently shears said retaining member so as to rotate said rotating drum in a webbing-taking-up direction, and cancels a holding state of said holding means so as to move said clamp member to said second position; and
an actuating source connected to one end of said wire and adapted to forcibly pull said wire in the webbing-taking-up direction and render the wire taut when the vehicle suddenly decelerates.

14. A preloader according to claim 13, wherein the tension of said wire necessary for causing said rotating drum to engage said takeup shaft is set to be smaller than the tension of said wire necessary for canceling the holding state of said holding means.

15. A preloader according to claim 14, wherein said wire cancels the holding state of said holding means as said wire is drawn out of said holding means.

16. A preloader according to claim 14, wherein an intermediate portion of said wire is bent by being wound around said holding means, and the holding state of said holding means is canceled as the bent portion of said wire is stretched by the tension of said wire.

17. A preloader according to claim 13, wherein said holding member is secured to said webbing retractor, and holds said clamp member in said first position as another end of said wire is disposed between said holding member and an arm extending from said clamp member, and wherein as said wire is rendered taut by said actuating source when the vehicle suddenly decelerates, said another end of said wire is disengaged from between said holding member and said arm, thereby allowing said clamp member to move to said second position.

18. A preloader according to claim 13, wherein said holding member is secured to an arm extending from said clamp member, and said clamp member is held in said first position as an intermediate portion of said wire is wound around said holding member, and wherein as said wire is rendered taut by said actuating source when the vehicle suddenly decelerates, said holding member is sheared, and said intermediate portion of said wire is disengaged from said holding member, thereby allowing said clamp member to move to said second position.

19. A preloader according to claim 13, wherein said holding member is constituted by cam means supported rotatably by said webbing retractor, and said clamp member is held in said first position as the rotation of said cam means is prevented by said wire.

20. A preloader according to claim 19, wherein said cam means has a substantially L-shaped guide slot, and a projection provided on said clamp member is guided by said guide slot as said cam means rotates, thereby moving said clamp member from said first position to said second position.

21. A preloader for use in a webbing retractor for forcibly taking up an occupant-restraining webbing onto a takeup shaft when a vehicle suddenly decelerates, comprising:
a deformable rotating drum constituted by a substantially cylindrical plastic member and capable of engaging said takeup shaft and becoming integral with said takeup shaft as said rotating drum is deformed, so as to impart a torque;
a clamp member disposed in correspondence with the webbing being drawn out of said takeup shaft and including a fixed block fixed to said webbing retractor and a movable block which opposes said fixed block with the webbing placed therebetween and is rotatable between a first position and a second position, said clamp member being arranged such that in said first position said movable block is spaced apart from the webbing, whereas in said second position said movable block engages the webbing and clamps the webbing being drawn out of said takeup shaft in cooperation with said fixed block, thereby preventing the drawing out of the webbing;
a resilient member for constantly urging said clamp member in a direction from said first position toward said second position;
holding means for normally holding said clamp member in said first position against an urging force of said resilient member and including a holding member secured to said webbing retractor and an arc extending from said clamp member;
a wire wound around said rotating drum and adapted to normally hold said clamp member in said first position with one end of said wire disposed between said holding member and said arm, said wire being arranged such that said wire, when tightly drawn, deforms said rotating drum, forcibly causes said rotating drum to engage said takeup shaft and to be rendered integral with said takeup shaft so as to rotate said rotating drum in a webbing-taking-up direction, and causes said one end of said wire to be disengaged from between said holding member and said arm so as to cancel a holding state of said holding means, thereby moving said clamp member to said second position; and
an actuating source connected to another end of said wire and adapted to forcibly pull the wire in the webbing taking-up direction and render the wire taut when the vehicle suddenly decelerates.

22. A preloader for use in a webbing retractor for forcibly taking up an occupant-restraining webbing onto a takeup shaft when a vehicle suddenly decelerates, comprising:
a deformable rotating drum constituted by a substantially cylindrical plastic member and capable of engaging said takeup shaft and becoming integral with said takeup shaft as said rotating drum is deformed, so as to impart a torque;

a clamp member disposed in correspondence with the webbing being drawn out of said takeup shaft and including a fixed block fixed to said webbing retractor and a movable block which opposes said fixed block with the webbing placed therebetween and is rotatable between a first position and a second position, said clamp member being arranged such that in said first position said movable block is spaced apart from the webbing, whereas in said second position said movable block engages the webbing and clamps the webbing being drawn out of said takeup shaft in cooperation with said fixed block, thereby preventing the drawing out of the webbing;

a resilient member for constantly urging said clamp member in a direction from said first position toward said second position;

holding means for normally holding said clamp member in said first position against an urging force of said resilient member;

a wire wound around said rotating drum and adapted to normally hold said clamp member in said first position with an intermediate portion of said wire wound around said holding means so as to form a bent portion, said wire being arranged such that said wire, when tightly drawn, deforms said rotating drum, forcibly causes said rotating drum to engage said takeup shaft and to be rendered integral with said takeup shaft so as to rotate said rotating drum in a webbing-taking-up direction, and causes said bent portion of said wire to be stretched and disengaged from said holding means so as to cancel a holding state of said holding means, thereby moving said clamp member to said second position; and an actuating source connected to one end of said wire and adapted to forcibly pull the wire in the webbing-taking-up direction and render the wire taut when the vehicle suddenly decelerates.

23. A preloader according to claim 22, wherein said holding means has a shear pin secured to an arm extending from said clamp member, and said clamp member is held in spaced-apart relationship with the webbing as the intermediate portion of said wire is wound around said shear pin, and wherein when the vehicle suddenly decelerates, said shear pin is sheared as said wire becomes taut, thereby moving said clamp member to said second position.

24. A preloader according to claim 22, wherein said holding means includes a cam supported rotatably by said webbing retractor, and said clamp member is held in said first position as said wire is wound and bent around an arm formed projectingly on an intermediate portion of said cam and the rotation of said cam is thereby prevented.

* * * * *